United States Patent
Milton et al.

(10) Patent No.: US 10,654,530 B2
(45) Date of Patent: May 19, 2020

(54) WRAP AROUND VEHICLE WINDSHIELD

(71) Applicant: Nikola Corporation, Phoenix, AZ (US)

(72) Inventors: Trevor R. Milton, Phoenix, AZ (US); Steve Jennes, Glendale, AZ (US)

(73) Assignee: Nikola Corporation, Phoenix, AZ (US)

( * ) Notice: Subject to any disclaimer, the term of this patent is extended or adjusted under 35 U.S.C. 154(b) by 0 days.

(21) Appl. No.: 16/381,434

(22) Filed: Apr. 11, 2019

(65) Prior Publication Data
US 2019/0248428 A1 Aug. 15, 2019

Related U.S. Application Data

(60) Continuation of application No. 15/591,095, filed on May 9, 2017, now abandoned, and a
(Continued)

(51) Int. Cl.
*B62D 35/00* (2006.01)
*B60K 1/00* (2006.01)
(Continued)

(52) U.S. Cl.
CPC ............ *B62D 35/001* (2013.01); *B60G 3/06* (2013.01); *B60G 3/20* (2013.01); *B60G 7/001* (2013.01); *B60G 11/27* (2013.01); *B60G 13/10* (2013.01); *B60J 1/008* (2013.01); *B60J 1/02* (2013.01); *B60K 1/00* (2013.01); *B60K 1/02* (2013.01); *B60K 7/0007* (2013.01); *B60K 17/043* (2013.01); *B60K 17/08* (2013.01); *B60K 17/145* (2013.01); *F16H 3/08* (2013.01); *F16H 57/025* (2013.01); *F16H 57/0424* (2013.01); *F16H 57/0476* (2013.01); *B60G 2200/14* (2013.01); *B60G 2200/144* (2013.01); *B60G 2202/1524* (2013.01); *B60G 2204/4191* (2013.01); *B60G 2206/011* (2013.01); *B60G 2206/0114* (2013.01); *B60G 2300/02* (2013.01); *B60G 2300/50* (2013.01); *B60K 2001/001* (2013.01);
(Continued)

(58) Field of Classification Search
CPC . B62D 35/001; B60J 1/02; B60J 1/008; B60J 1/06
USPC ........................................ 296/96.12, 190.1
See application file for complete search history.

(56) References Cited

U.S. PATENT DOCUMENTS 3,770,312 A * 11/1973 Shadburn ............... B60J 1/1884
296/190.1
D254,060 S * 1/1980 Spellins ..................... D12/96
(Continued)

*Primary Examiner* — Jason S Morrow
(74) *Attorney, Agent, or Firm* — Snell & Wilmer L.L.P.

(57) ABSTRACT

Systems, methods, and devices for a vehicle windshield are described herein. A vehicle includes a vehicle body comprising a front, a first side, and a second side, wherein the first side and the second side are opposite one another on the vehicle body. The vehicle comprises a cabin located within the body of the vehicle, wherein the cabin comprises an interior that is configured to accommodate at least one person. The vehicle comprises at least one door that provides ingress and egress to the interior of the cabin of the vehicle. The vehicle comprises a windshield that provides a visual line of sight out of the cabin for a user located within the interior of the cabin, and wherein the windshield extends across the front and at least partially on to at least one of the first side or the second side.

20 Claims, 14 Drawing Sheets

Related U.S. Application Data continuation-in-part of application No. 15/410,130, filed on Jan. 19, 2017, now Pat. No. 10,370,041, which is a division of application No. 15/396,209, filed on Dec. 30, 2016, now Pat. No. 10,077,084, and a continuation-in-part of application No. 15/357,350, filed on Nov. 21, 2016, now Pat. No. 10,207,751.

(60) Provisional application No. 62/391,745, filed on May 9, 2016, provisional application No. 62/391,745, filed on May 9, 2016, provisional application No. 62/273,256, filed on Dec. 30, 2015, provisional application No. 62/381,745, filed on Aug. 31, 2016.

(51) Int. Cl.

| | |
|---|---|
| *B60K 7/00* | (2006.01) |
| *B60G 3/20* | (2006.01) |
| *B60K 17/08* | (2006.01) |
| *B60K 17/14* | (2006.01) |
| *B60G 3/06* | (2006.01) |
| *B60K 1/02* | (2006.01) |
| *B60K 17/04* | (2006.01) |
| *F16H 3/08* | (2006.01) |
| *F16H 57/025* | (2012.01) |
| *F16H 57/04* | (2010.01) |
| *B60G 7/00* | (2006.01) |
| *B60G 13/10* | (2006.01) |
| *B60G 11/27* | (2006.01) |
| *B60J 1/00* | (2006.01) |
| *B60J 1/02* | (2006.01) |
| *F16H 57/02* | (2012.01) |

(52) U.S. Cl.
CPC .............. *B60K 2007/0038* (2013.01); *B60K 2007/0046* (2013.01); *B60K 2007/0061* (2013.01); *B60Y 2200/14* (2013.01); *B60Y 2400/3032* (2013.01); *F16H 2057/02034* (2013.01)

(56) References Cited

U.S. PATENT DOCUMENTS

| | | | | |
|---|---|---|---|---|
| D291,674 S | * | 9/1987 | Smith | D12/96 |
| D291,872 S | * | 9/1987 | Simons | 296/180.2 |
| 4,867,468 A | * | 9/1989 | Paul | B60D 1/00 |
| | | | | 280/402 |
| 4,932,716 A | * | 6/1990 | Marlowe | B62D 33/06 |
| | | | | 296/180.2 |
| 5,383,304 A | * | 1/1995 | Codina Soley | E05D 15/1044 |
| | | | | 49/210 |
| D357,436 S | * | 4/1995 | Moar | D12/96 |
| 7,641,269 B2 | * | 1/2010 | Matsumoto | B62D 25/04 |
| | | | | 280/756 |
| D626,890 S | * | 11/2010 | Cantemir | D12/12 |
| D826,098 S | * | 8/2018 | Armigliato | D12/93 |
| 2002/0175534 A1 | * | 11/2002 | Strong | B60J 1/008 |
| | | | | 296/77.1 |
| 2011/0114398 A1 | * | 5/2011 | Bianco | B60L 50/66 |
| | | | | 180/65.1 |

* cited by examiner

WRAP AROUND VEHICLE WINDSHIELD

CROSS REFERENCE TO RELATED APPLICATIONS

This application is a continuation of U.S. patent application Ser. No. 15/591,095 filed on May 9, 2017, now U.S. Patent Application Publication 2018-0001942 entitled "WRAP AROUND VEHICLE WINDSHIELD," U.S. Ser. No. 15/591,095 claims priority to and the benefit of U.S. Provisional Patent Application Ser. No. 62/391,745, filed May 9, 2016, entitled "ELECTRIC VEHICLE." This application is also a continuation-in-part of U.S. patent application Ser. No. 15/410,130, filed Jan. 19, 2017, now U.S. Patent Application Publication 2017-0197495 entitled "SYSTEMS, METHODS, AND DEVICES FOR AN AUTOMOBILE DOOR OR WINDOW." U.S. patent application Ser. No. 15/410,130 is a divisional of U.S. patent application Ser. No. 15/396,209 filed. Dec. 30, 2016, now U.S. Pat. No. 10,077,084 entitled "SYSTEMS, METHODS, AND DEVICES FOR AN AUTOMOBILE DOOR OR WINDOW." U.S. patent application Ser. No. 15/396,209 claims priority to, and the benefit of, U.S. Provisional Application Ser. No. 62/391,745 filed on May 9, 2016 entitled "ELECTRIC VEHICLE," and U.S. Provisional Application Ser. No. 62/273,256 filed on Dec. 30, 2015 entitled "SYSTEMS, METHODS, AND DEVICES FOR AN AUTOMOBILE DOOR OR WINDOW," U.S. patent application Ser. No. 15/396,209 is also a continuation-in-part of U.S. patent application Ser. No. 15/357,350 filed on Nov. 21, 2016, now U.S. Patent Application Publication No. 2017-0320382 entitled "MOTOR GEARBOX ASSEMBLY," which likewise claims priority to, and the benefit of, U.S. Provisional Application Ser. No. 62/391,745 filed on May 9, 2016 entitled "ELECTRIC VEHICLE." The disclosures of all the foregoing applications are incorporated herein by reference in their entireties, including but not limited to those portions that specifically appear hereinafter, but except for any subject matter disclaimers or disavowals, and except to the extent that the incorporated material is inconsistent with the express disclosure herein, in which case the language in this disclosure shall control. Each of the foregoing applications is hereby incorporated by reference in its entirety.

TECHNICAL FIELD

The disclosure relates generally to systems, methods, and devices for an automobile windshield, and more particularly relates to methods, systems, and devices for a windshield on a semi-truck vehicle.

BACKGROUND

A variety of windows and front windshields for automobiles have been developed and are known for providing a line of sight out of a vehicle and protection to a driver of the vehicle. Vehicle windows and windshields, and particularly semi-truck windows and windshields, are often attached to a bulky frame. The bulky frame causes the windshield to provide a limited view out of the vehicle that may obstruct vision and cause safety hazards for the driver and other persons on the road. Further, automobiles often include a front windshield and at least one side window formed of different pieces of material. The front windshield in automobiles, and particularly in semi-trucks, is often attached at a sharp angle relative to a front engine portion of the vehicle such that the overall shape of the vehicle is not particularly aerodynamic.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Figure 1:
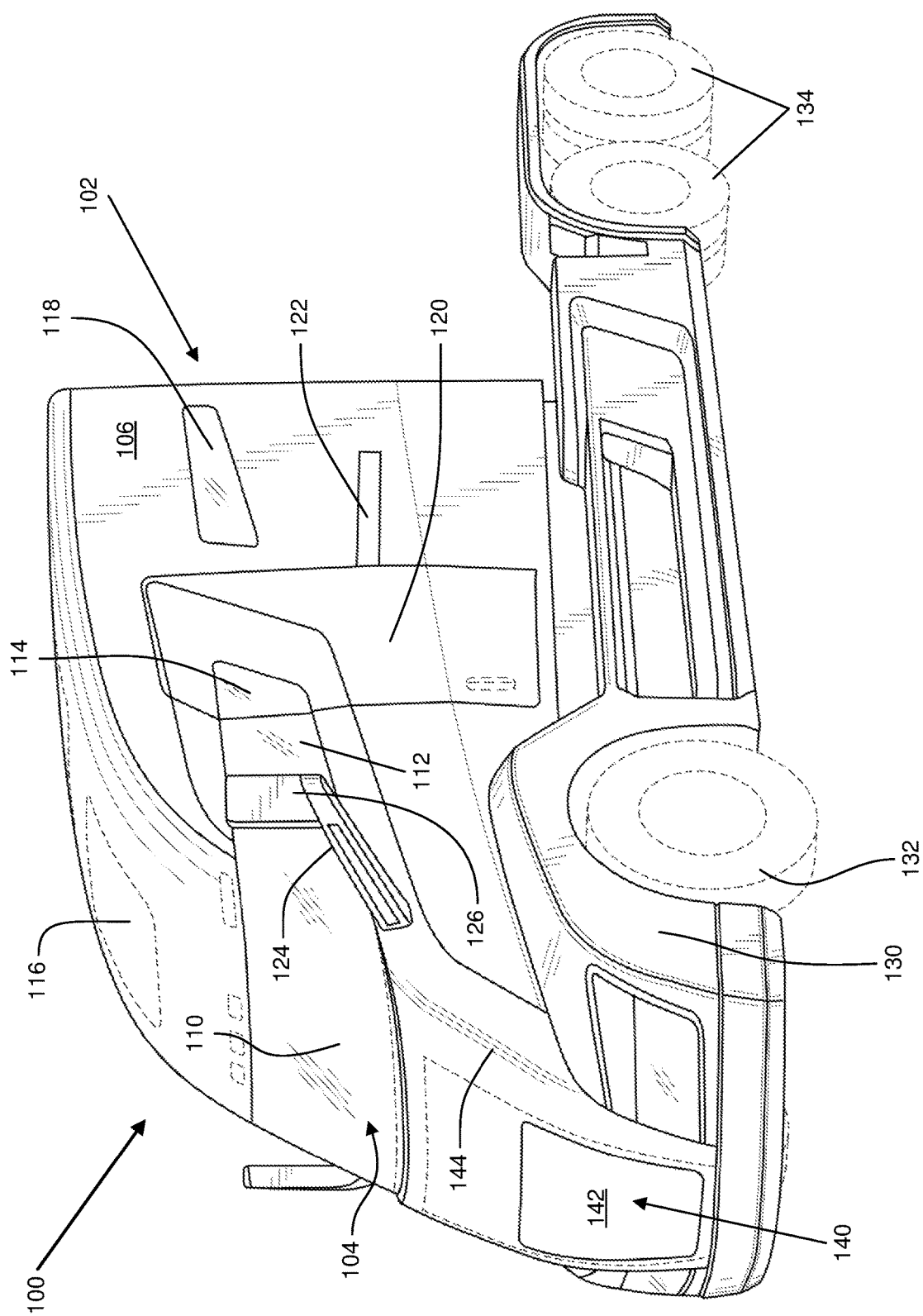
FIG. 1 illustrates a front perspective view of a vehicle with a wrap-around windshield in accordance with the teachings and principles of the disclosure.

Applicant has recognized that it is advantageous to provide a vehicle window or windshield, and particularly a semi-truck windshield, that allows a user to enjoy a wide visual perspective from an interior of the vehicle to the exterior of the vehicle. Applicant has further recognized that it is advantageous to provide a semi-truck having an aerodynamic shape. According to one aspect of the disclosure, a vehicle includes a vehicle body having a front, a first side, and a second side, wherein the first side and the second side are opposite to one another on the vehicle body. The vehicle includes a cabin located within the body of the vehicle, wherein the cabin comprises an interior that is configured to accommodate at least one person. The vehicle includes at least one door that provides ingress and egress to the interior of the cabin of the vehicle. The vehicle includes a windshield that provides a visual line of sight out of the cabin for a user located within the interior of the cabin, wherein the windshield extends across the front and onto at least a portion of at least one of the first side or the second side.

According to another aspect of the disclosure, an electric powered semi-truck includes a vehicle body comprising a front, first side, and a second side, wherein the first side and the second side are opposite to one another on the vehicle body. The vehicle includes a front portion of the vehicle comprising a front 50% of the total length of the vehicle. The vehicle includes at least two front wheels located within the front portion of the vehicle. The vehicle includes a cabin located within the vehicle body, wherein the cabin comprises a cabin interior configured to accommodate at least one person. The vehicle includes a windshield at the front end of the vehicle, wherein the windshield is configured to provide a visual line of sight from the cabin interior to an exterior of the vehicle, wherein the windshield extends across the front and onto a portion of at least one of the first side or the second side, and wherein at least a portion of the windshield is located above at least a portion of at least one of the two front wheels.

The disclosure relates generally to systems, methods, and devices for an automobile window or windshield. In the following description of the disclosure, reference is made to the accompanying drawings, which form a part hereof, and in which is shown by way of illustration specific implementations in which the disclosure may be practiced. It is understood that other implementations may be utilized and structural changes may be made without departing from the scope of the disclosure.

Despite the existing systems, methods, and devices relating to automobile windows or windshields, systems, methods, and devices for an automobile window or windshield are still being developed and are needed. As will be seen, the disclosure provides such methods, systems, and devices for windshields and windows of an automobile, particularly for semi-trucks, in an effective and elegant manner.

For purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of the disclosure, are to be considered within the scope of the disclosure.

It is to be understood that this disclosure is not limited to the particular configurations, process steps, and materials disclosed herein as such configurations, process steps, and materials may vary somewhat. It is also to be understood that the terminology employed herein is used for describing particular embodiments only and is not intended to be limiting.

In describing the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," including," "containing," "characterized by," and grammatical equivalents thereof are inclusive or open-ended terms that do not exclude additional, unrecited elements or method steps.

Referring now to the figures, FIG. 1 is a front perspective view of an embodiment of a vehicle 100 made in accordance with the teachings and principles of the disclosure. FIG. 1 shows an example vehicle 100, which is an electric driven class 8 semi-truck. In one embodiment, the vehicle 100 is configured to pull a total gross weight of 80,000 pounds approximately 800 miles to 1,200 miles between stops, or more than 1,200 miles between stops. However, it will be appreciated that the teachings and principles of the disclosure may be applicable to any vehicle of any size for providing transportation, whether driven by an automation system or by a human.

In an implementation, the vehicle 100 is an electric driven semi-truck 100 having a vehicle body 102. The vehicle includes a front end 140 situated on a front-most portion 142 of the vehicle 100. In an implementation, the front end 140 is formed in an aerodynamic shape. The front end 140 has a curvature 144 forming an aerodynamic curvature optimized for reducing drag when the vehicle 100 is moving. The vehicle includes a side portion 106 normal to the front end 140 of the vehicle. The vehicle may include a first side portion and a second side portion located parallel and opposite one another on either side of the vehicle 100. The vehicle 100 includes a windshield 104 having a front windshield portion 110 and a side windshield portion 112. The vehicle 100 further includes a door 120 and a door window 114. The vehicle includes at least one overhead window 116 or skylight. The vehicle further includes a side window 118.

The vehicle 100 includes a side rear-view mirror 126 configured to provide a visual reflection of objects behind and to the side of the vehicle 100. The side rear-view mirror 126 is attached to the vehicle 100 via a mirror attachment component 124. In an implementation, the mirror attachment component 124 is located below the front windshield portion 110 on the side portion 106 of the vehicle. In an implementation, the mirror attachment component 124 is located below the front windshield portion 110 at the front end 140 of the vehicle. In an implementation, the mirror attachment component 124 is located on an aerodynamic portion between the front end 140 and the side portion 106.

The vehicle 100 includes a front wheel well 130 situated within the front 50% of the vehicle body 102. The front wheel well 130 is configured to house and protect a front wheel 132. The vehicle 100 further includes at least one rear wheel 134. In an implementation, at least a portion of the windshield 104 is located directly above the front wheel well 130 and front wheel 132. In an implementation, a portion of the side windshield portion 112 is located above a portion of the front wheel well 130 or front wheel 132.

The vehicle 100 includes at least one door 120. In an implementation, the door 120 is a sliding door 120 that slides on a track 122. In such an implementation, the sliding door 120 is configured to move outward with respect to the side portion 106 and backward with respect to the front end 140 when the sliding door 120 is opened. In an implementation, the door 120 includes a door window 114. The door window 114 may be sized such that a side of the door window 114 matches up with a side of the windshield 104. In such an implementation, the windshield 104 and the door window 114 provide a continuous field of vision from an interior of the vehicle 100 to an exterior of the vehicle 100. In an implementation, the door window 114 forms a watertight seal with the windshield 104 when the door 120 is closed.

In an implementation, the door 120 is located directly above a portion of at least one step such that a user may comfortably ascend or descend the step when entering or exiting the vehicle through the door 120. The door 120 is located to a backside of the at least one front wheel 132 and wheel well 130. In an implementation, a step is connected to the front wheel well 130 and the door 120 is positioned immediately above the step.

In an implementation, the front windshield portion 110 has a curvature matching the front-end curvature 144 of the vehicle 100. That is, the front windshield portion 110 and the front end 140 may form a continuous shape without any sharp angles. In an implementation, the front end 140 and the front windshield portion 110 forms a straight line at the connection between the front windshield portion 110 and the front end 140. In an implementation, the front end 140 and the windshield form a water tight seal. In an implementation, the front windshield portion 110 and the front end 140 may form a shape that follows the curvature of a fuselage of the vehicle. In an implementation, the front end 140 and the front windshield portion 110 follow a similar curvature at the connection between the front windshield portion 110 and the front end 140.

In an implementation, the front windshield portion 110 is a single piece of material. In an implementation, the front windshield portion 110 forms a continuous field of vision from the inside of vehicle body 102 to an exterior of the vehicle. The front windshield portion 110 is constructed of any suitable transparent substrate, including glass. In an implementation, the front windshield portion 110 is a single piece of glass molded to the curvature of the vehicle 100. In an implementation, the front windshield portion 110 includes a plurality of pieces of material forming a nearly continuous field of vision from the inside of vehicle body 102 to an exterior of the vehicle. In such an implementation, the separate pieces of material forming the front windshield portion 110 may taper from the front of the vehicle toward the rear of the vehicle. As the windshield moves toward the rear of the vehicle, the windshield may taper.

It should be noted that the size and shape of the front windshield portion 110 can have a dramatic impact on the visibility from inside the vehicle body 102 and can further have a dramatic impact on the driver's ability to view surrounding people, vehicles, and obstructions. A larger front windshield portion 110 that wraps around the vehicle body 102 forming a continuous piece of transparent substrate can greatly increase the ability of a driver of the vehicle 100 to view obstacles and drive safely. For example, in the art semi-trucks include large and obstructive frame panels on the corners of the vehicle cabin. These frame panels introduce dramatic blind spots wherein the driver cannot view all persons, vehicles, or objects surrounding the semi-truck. In an implementation of the present application, however, the front windshield portion 110 comprises a continuous wrap-around sheet of glass molded to the curvature of the vehicle body 102. The continuous wrap-around front windshield portion 110 eliminates the need for obstructive frame members that reduce safety when operating the vehicle.

It should further be noted that a continuous wrap-around front windshield portion 110 can greatly enhance the aerodynamics of the vehicle 100. In an implementation, where the front windshield portion 110 comprises a curvature matching the curvature 144 of the front end 140 of the vehicle 100, the front windshield portion 110 supports the aerodynamics of the vehicle and reduces drag. This is important for reducing the energy required to operate the vehicle and propel it forward.

The aerodynamic vehicle body 102 is configured and formed to reduce drag when the vehicle 100 is in motion. In an implementation, the vehicle 100 is an electric powered semi-truck and the vehicle does not include a combustion engine at the front side of the vehicle. Therefore, because the vehicle does not include a combustion engine, the vehicle body 102 may have a particularly aerodynamic shape. In an implementation, the front windshield portion 110 is located near the front-most point of the vehicle 100 and the front windshield portion 110 and panoramic windows 112, 114, 118 are configured to provide a user with a wide range of visibility. It should be appreciated that locating a seat near the front end 140 of the vehicle and providing a panoramic view of the surroundings will increase safety and visibility when operating the vehicle.

In an implementation, the vehicle 100 includes a cabin within the vehicle body 102 that is 30% larger than a typical cab in a semi-truck, yet is more aerodynamic and has a lower coefficient of drag than a typical cab of a semi-truck. In an implementation, the coefficient of drag is nearly 5% lower compared to current semi-trucks on the market. The cab may also include a full-size fridge and freezer, electric climate control, a touch screen display, 4G LTE Internet access, over-the-air software updates, a sunroof, two full size beds, a microwave, and a television. Each of these features may be powered by the ESS, alleviating the need to idle or run a separate generator.

In an implementation, the vehicle's 100 heavy components are arranged to sit at or below a frame rail, thereby lowering the center of gravity by several feet and improving anti-roll over capabilities. This may be partially accomplished by removing the diesel engine and transmission associated with a typical class 8 truck, and manufacturing the cab out of light, but stronger carbon fiber panels. Benefits of removing the diesel engine may include a drastic reduction in greenhouse gas emissions, a larger and more aerodynamic cab and a significantly quieter ride. All that is necessary to make the vehicle 100 go or stop may be the electric pedal and brake pedal (no shifting or clutches). The vehicle's 100 simplified operation may open up the long-haul market to a new group of drivers.

In an implementation, the vehicle 100 is a 100% electric driven vehicle and does not include class 8 semi-truck parts such as a diesel engine, emissions equipment, transmission, and drive train and differentials. The absence of these features makes the vehicle 100 thousands of pounds lighter than the average class 8 semi-truck on the market.

In an implementation, the vehicle 100 is powered by any suitable energy storage system (ESS), such as a rechargeable battery pack that is charged in any suitable manner. For example, the ESS may include a liquid cooled lithium-ion battery pack (over 30,000 lithium cells), which may be charged by an onboard turbine of a turbine assembly. The turbine may automatically charge the batteries of the ESS when needed and eliminate the need to ever "plug-in." The turbine may produce nearly 400 kW of clean energy, for example, which may provide ample power to permit the vehicle 100 to climb a 6% grade at maximum weight at 65 MPH. A typical class 8 diesel truck under similar conditions may have a challenging time reaching 35 MPH. And going downhill, the vehicle's electric motors may be configured to absorb the braking energy normally lost and deliver it back to the batteries, increasing component life, miles per gallon, safety, and freight efficiencies while eliminating noisy engine brakes and reducing the potential for runaway trucks.

In an implementation, the vehicle 100 has compatibility with driverless vehicles. In such an implementation, a single driver may have the ability to virtually hitch and lead up to five driverless vehicles 100 through a wireless vehicle network and self-driving technology. This technology could solve the driver shortage and increased freight costs facing the long-haul transportation industry.

The vehicle 100 shown in FIG. 1 includes an electric motor and associated gear train (e.g., gear train with dual gear reduction) at every wheel 132, 134, which motors and gear trains may be grouped in pairs to form a motor gearbox assembly as described in further detail in U.S. patent application Ser. No. 15/357,350 filed Nov. 21, 2016, which is hereby incorporated by reference in its entirety herein. In the embodiment shown in FIG. 1, the four rear wheels 134 each include a dual wheel pair (two wheels that rotate together). The electric motor may be configured to produce any suitable horsepower (HP), such as 100 to 400 HP, with four to six motors combined, may output as much as 2,000 HP and over 3,700 ft. lbs. of torque before gear reduction, and potentially 86,000 ft, lbs. of instant torque after gear reduction. The vehicle's four to six electric motors may produce superior horsepower, torque, acceleration, pulling and stopping power over other class 8 semi-trucks known in the art. It should be noted that the inclusion of an electric motor, and the elimination of a standard combustion engine, may allow for the reconfiguration of the layout and structure of a standard semi-truck as known in the art. The reconfiguration of many components of the vehicle body 102 can be advantageous to a user, as disclosed and described in the present application. The elimination of the combustion engine has, for example, provided for the at least one seat to be located at a position nearer the front of the vehicle body 102 than in a conventional semi-truck.

In an embodiment, the vehicle is powered by an electric motor. The electric motors may be powered by any suitable energy storage system (ESS) such as a rechargeable battery pack and hydrogen fuel cell that may be charged or powered in any suitable manner. For example, the ESS may include a liquid cooled lithium-ion battery pack which may be charged by an onboard fuel cell or fuel cell assembly. The fuel cell may automatically charge the batteries of the ESS when needed and eliminate the need to ever "plug-in" the batteries. The fuel cell may produce clean energy, which may provide ample power to power the vehicle. When going downhill, the vehicle's electric motors may be configured to absorb braking energy that is normally lost and deliver the braking energy back to the batteries, thereby increasing component life, miles per gallon, safety, and freight efficiencies while eliminating noisy engine brakes and reducing the potential for a runaway vehicle.

Figure 2:
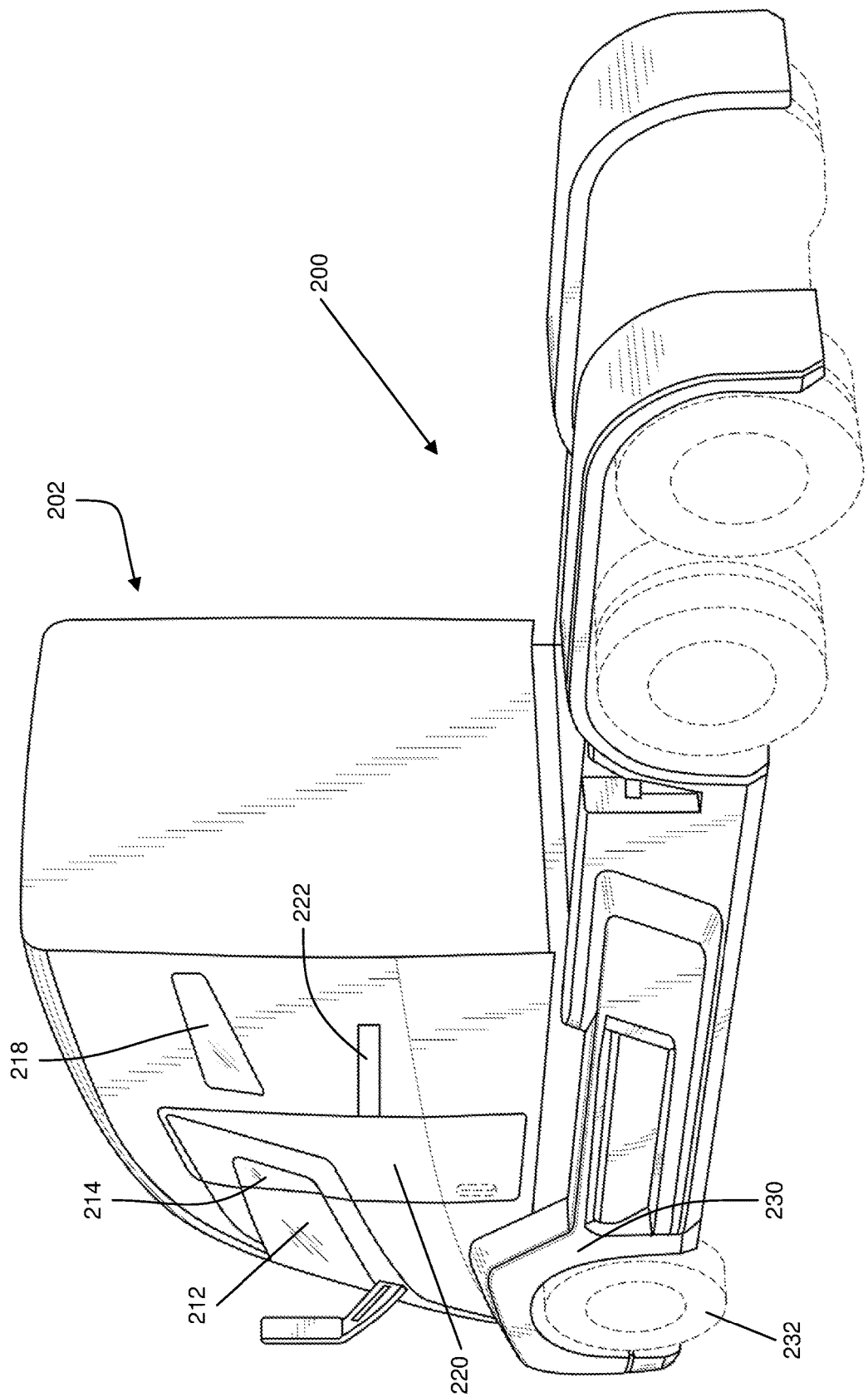
FIG. 2 illustrates a rear perspective view of a vehicle with a wrap-around windshield in accordance with the teachings and principles of the disclosure.

Referring now to FIG. 2, a rear perspective view of a vehicle 200 is shown. The vehicle 200 includes a vehicle body 202 having a cabin located within the vehicle body (not shown) configured to accommodate at least one person. The vehicle 200 includes a windshield having a side windshield portion 212. The vehicle includes a side window 218 and a door window 214. In an implementation, the door window 214 lines up with the side windshield portion 212 when the door 220 is closed. As pictured in FIG. 2, the door 220 may be a sliding door that slides on a track 222. The vehicle body 202 includes a front wheel well 230 formed around a front wheel 232. In an implementation, at least a portion of the side windshield portion 212 is located above at least a portion of the front wheel well 230 and/or front wheel 232.

Figure 3:
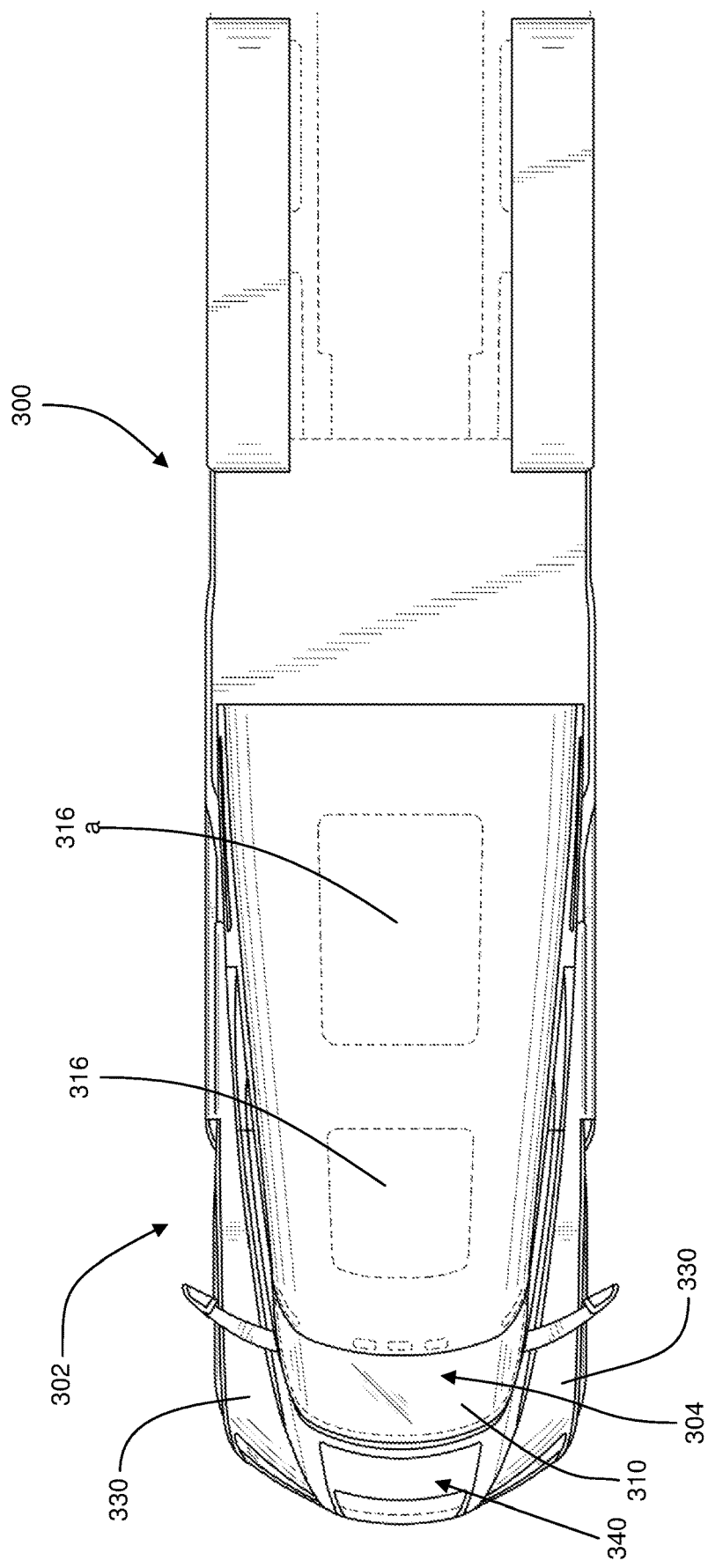
FIG. 3 illustrates an aerial view of a vehicle with a wrap-around windshield in accordance with the teachings and principles of the disclosure.

FIG. 3 illustrates an aerial view of a vehicle 300. The vehicle 300 includes a vehicle body 302 including a cabin interior located within the vehicle body that is configured to accommodate at least one person. The vehicle 300 includes a front end 340 and a windshield 304 having a front windshield portion 310. The vehicle 300 includes an overhead window or skylight 316, 316a. The vehicle includes a front wheel well 330 configured to house a front wheel (not shown). In an implementation, the windshield 304 is a wrap-around windshield and a portion of the windshield 304 is positioned directly above at least a portion of the front wheel well 330.

Figure 4:
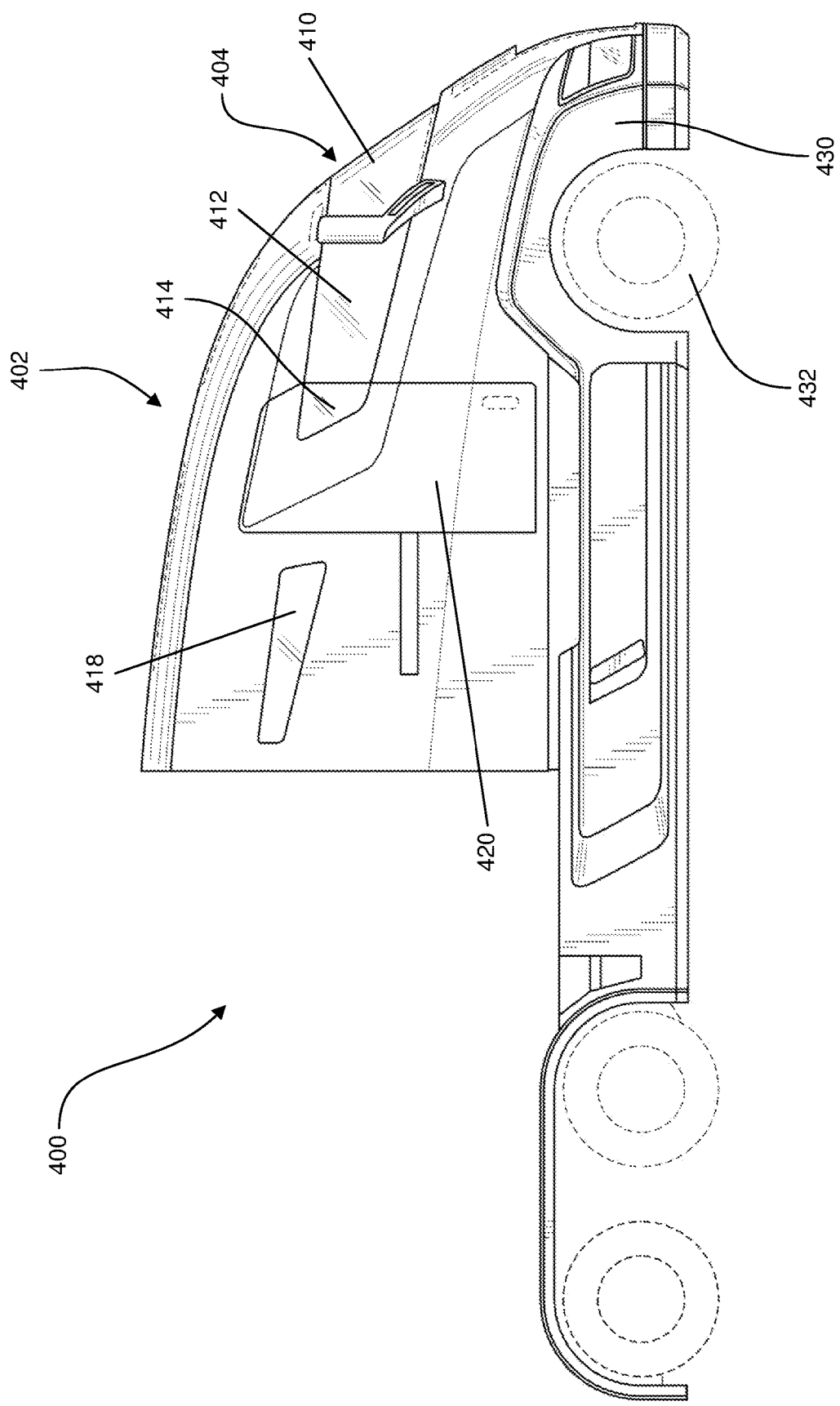
FIG. 4 illustrates a side view of a vehicle in accordance with the teachings and principles of the disclosure.

Referring now to FIG. 4, a side view of a vehicle 400 having a vehicle body 402 is shown. The vehicle body 402 includes a cabin interior located within the vehicle body 402 that is configured to accommodate at least one person. The cabin interior is accessible through the door 420 that provides ingress and egress for the cabin interior. In an implementation, the cabin interior comprises the interior space of the vehicle body 402. In an implementation, the cabin interior includes, for example, a full-size bed, a television, a refrigerator and/or freezer, and a spacious cockpit driving area having a panoramic windshield 404. The panoramic windshield 404 includes a front windshield portion 410 and at least one side windshield portion 412. The panoramic windshield 404 may include two side windshield portions 412 on either side of the vehicle 400. The panoramic windshield 404 may comprise a single continuous piece of a transparent substrate molded to match the curvature of the front portion of the vehicle. The vehicle 400 includes a door 420 having a door window 414 that is configured to line up with and match an end of the side windshield portion 412. In an implementation, as pictured in FIG. 4, the door window 414 extends a portion of the horizontal length of the door. In an implementation, the door window 414 extends an entire length of the horizontal length of the door. In yet another implementation, the door window 414 extends the horizontal length of the door and matches up with an end of the side windshield portion 412 on one side and matches up with a side window 418 on the other side when the door is closed.

The vehicle 400 further includes a front wheel well 430 and a front wheel 432 positioned near the front of the vehicle. The front portion of the vehicle 400 may include the front-most 50% of the vehicle, and the front wheel well 430 and the front wheel 432 are positioned within the front-most 50% of the vehicle. The front of the vehicle is denoted by the end of the vehicle that is facing forward when the vehicle is propelled forward.

Figure 5:
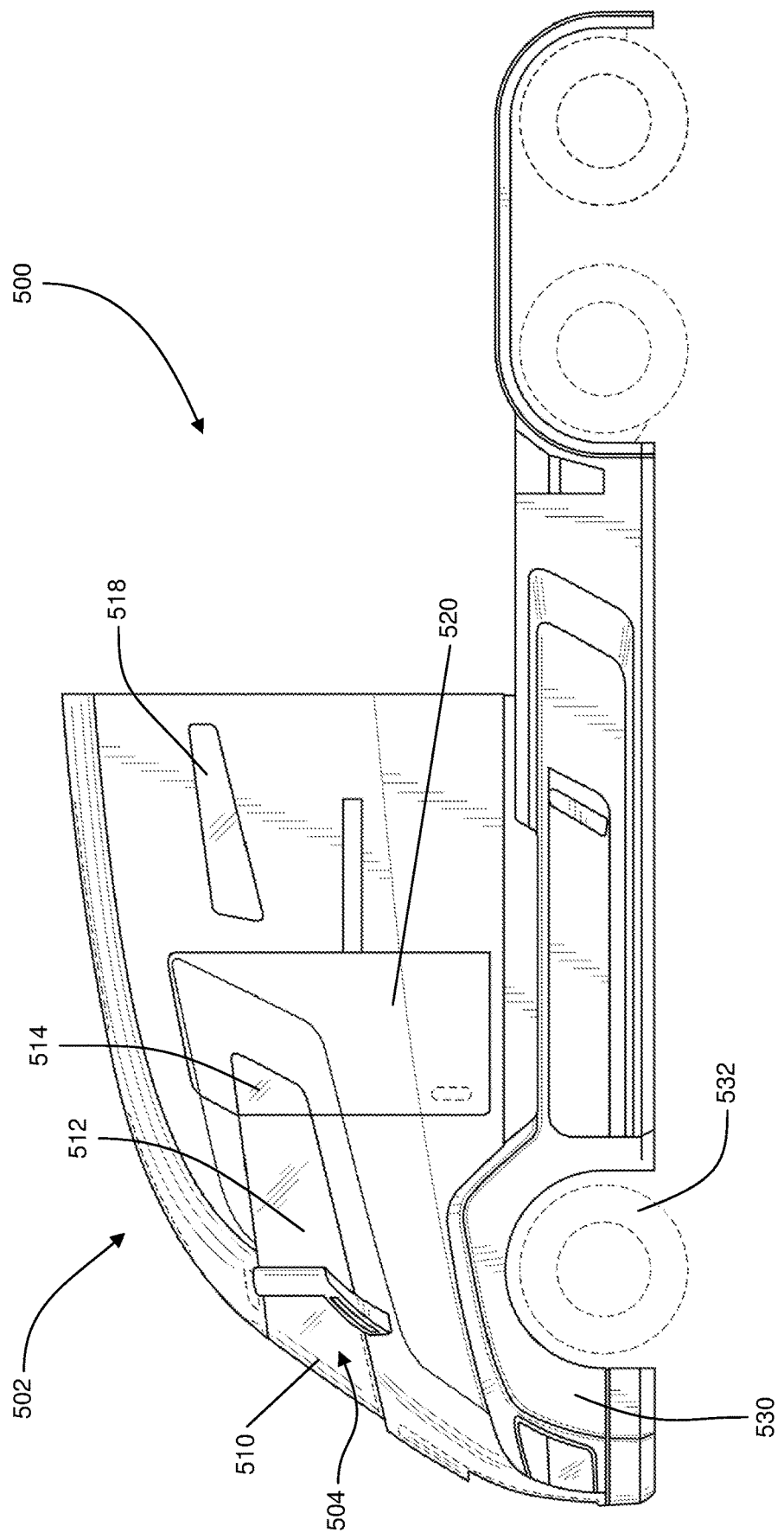
FIG. 5 illustrates a side view of a vehicle with a wrap-around windshield in accordance with the teachings and principles of the disclosure.

FIG. 5 is a side view of a vehicle 500 having a vehicle body 502 and an aerodynamic wrap around windshield 504. The windshield 504 includes a front windshield portion 510 and a side windshield portion 512. The vehicle includes a door 520 and a door window 514 that may be in contact with a portion of the side windshield portion 512 when the door 520 is closed. The vehicle includes a side window 518 that may be in contact with the door window 514 in an implementation (not shown). The vehicle includes a front wheel well 530 and a front wheel 532, wherein at least a portion of the windshield 504 may be position directly above at least a portion of at least one of the front wheel well 530 and/or the front wheel 532.

Figure 6:
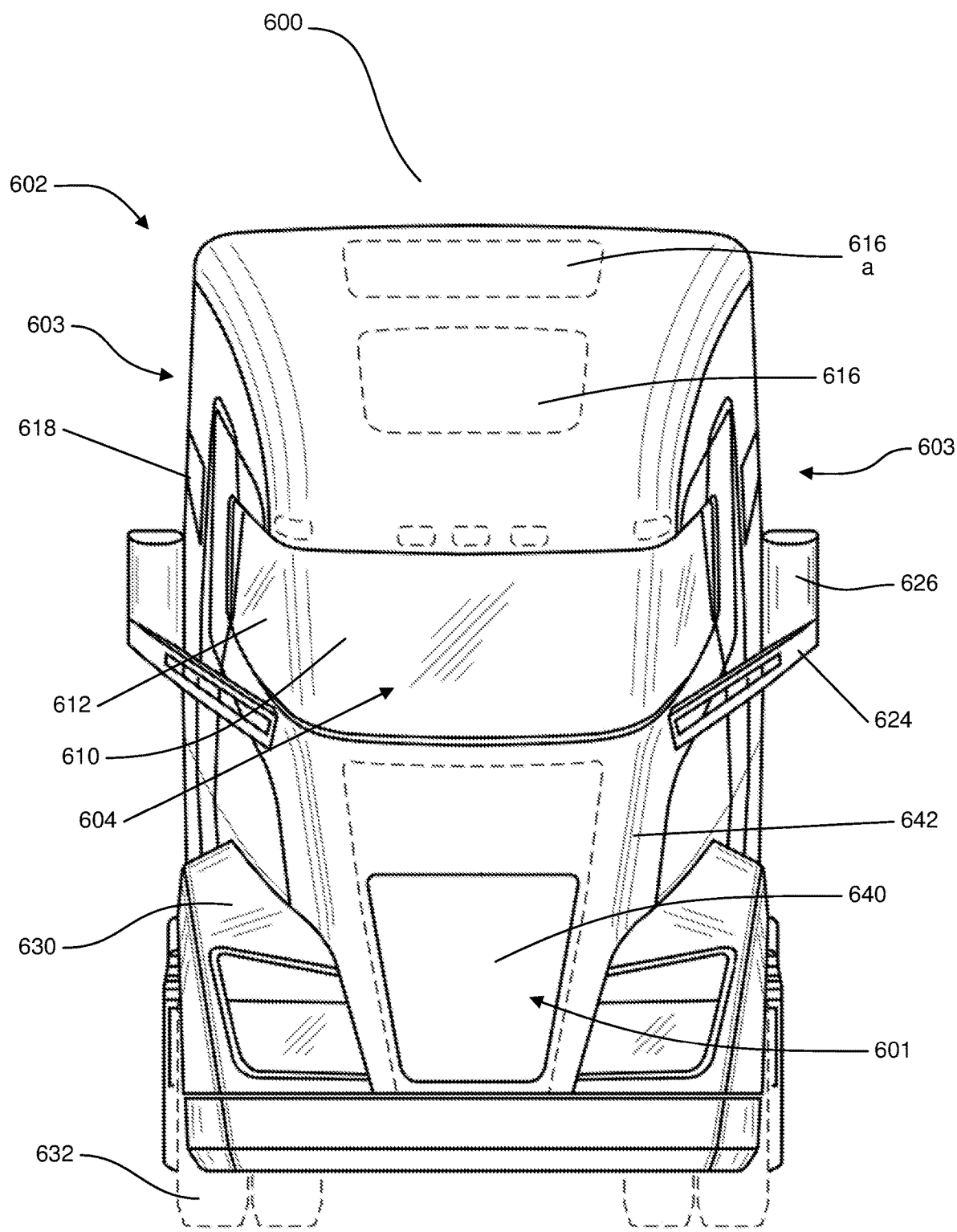
FIG. 6 illustrates a front view of a vehicle with the wrap-around windshield in accordance with the teachings and principles of the disclosure.

Referring now to FIG. 6, a front view of a vehicle 600 is shown. In an implementation, the vehicle 600 is an electrically powered semi-truck vehicle having a vehicle body 602 and a vehicle front end 640. The vehicle front end 640 is denoted by the front portion of the vehicle that is facing forward when the vehicle is propelled in the forward direction. The vehicle includes a plurality of front wheel wells 630 and front wheels 632 integrated into the front portion of the vehicle 600. The vehicle includes a side window 618 and a plurality of roof windows or skylights 616, 616*a*. The vehicle includes a panoramic and aerodynamic wraparound windshield 604 having a front windshield portion 610 and a side windshield portion 612. The vehicle 600 includes a side rear-view mirror 626 attached to the vehicle body 602 by way of a rear-view mirror connection component 624. In an implementation, the side rear-view mirror 626 extends farther outward than a side portion 603 of the vehicle. In various implementations, the side rear-view mirror 626 is located in the front portion of the vehicle body 602, a side portion of the vehicle 603, or portion between the front portion and the side portion (as pictured).

The front portion 601 includes vehicle body curvature 642 configured to increase the aerodynamic nature of the vehicle body 602. In an implementation, the windshield 604 is molded to match the vehicle body curvature 642 such that the front portion 601 of the vehicle is a continuous shape without any sharp angles or breaks. In such an implementation, the front portion 601 and the windshield 604 may form a continuously straight line without a sharp angle. In an implementation, the windshield 604 and the front end 640 may form a shape that follows the curvature of a fuselage of the vehicle. In an implementation, the front end 640 and the windshield 604 follow a similar curvature at the connection between the windshield 604 and the front end 640.

Figure 7:
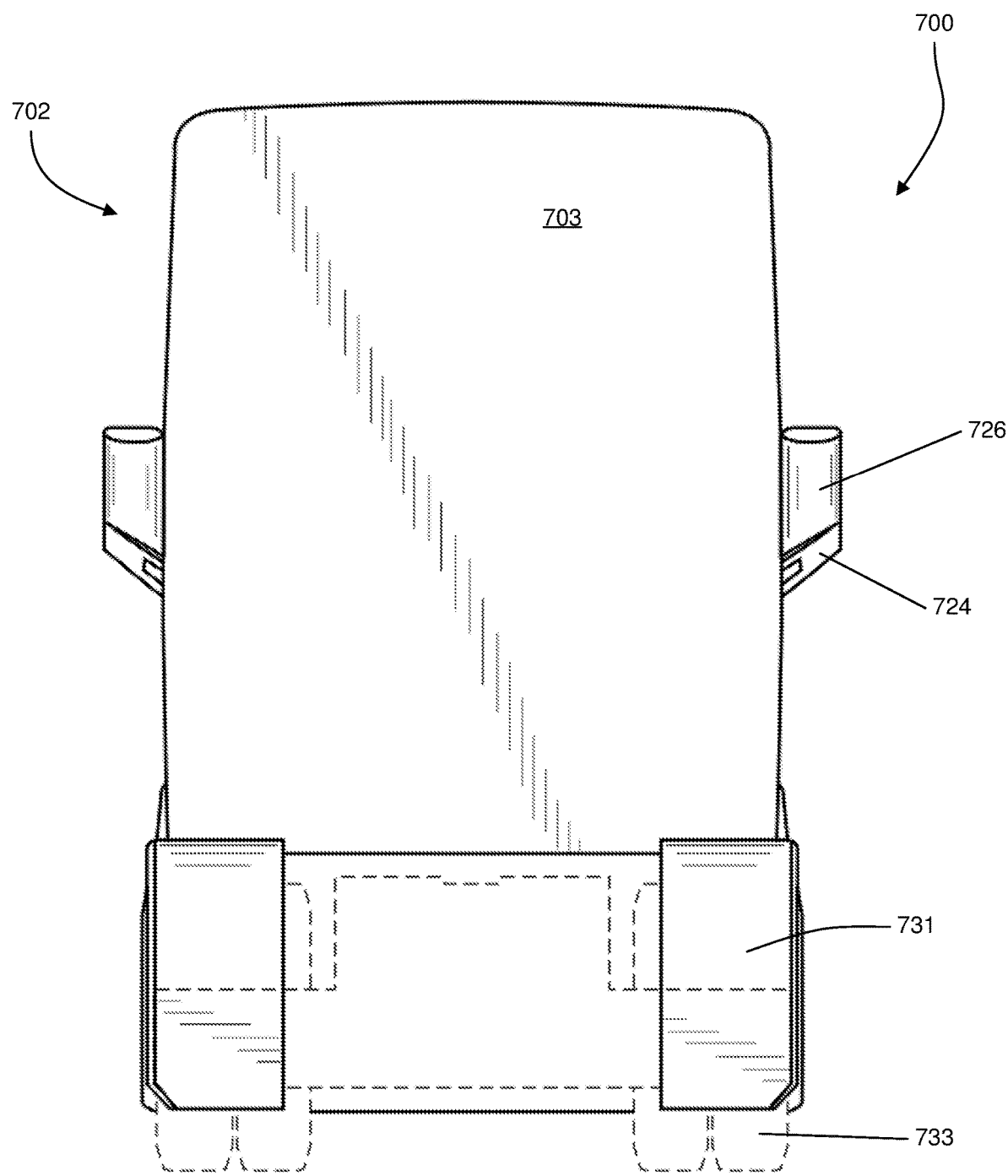
FIG. 7 illustrates a rear view of a vehicle with a wrap-around windshield in accordance with the teachings and principles of the disclosure.

FIG. 7 is a rear view of a vehicle 700, and particularly an electrically driven semi-truck vehicle. The vehicle 700 includes a vehicle body 702 that includes a cabin interior located within the vehicle body 702 that can accommodate at least one person. The vehicle body 702 includes a backside surface 703. The vehicle 700 includes a plurality of rear wheel wells 731 and a plurality of rear wheels 733. The vehicle 700 includes a side rear-view mirror 726 attached to the vehicle body 702 with a rear-view mirror attachment component 724. In an implementation as pictured, the side rear-view mirror 726 extends farther out than the vehicle body 702 on each side of the vehicle 700.

Figure 8:
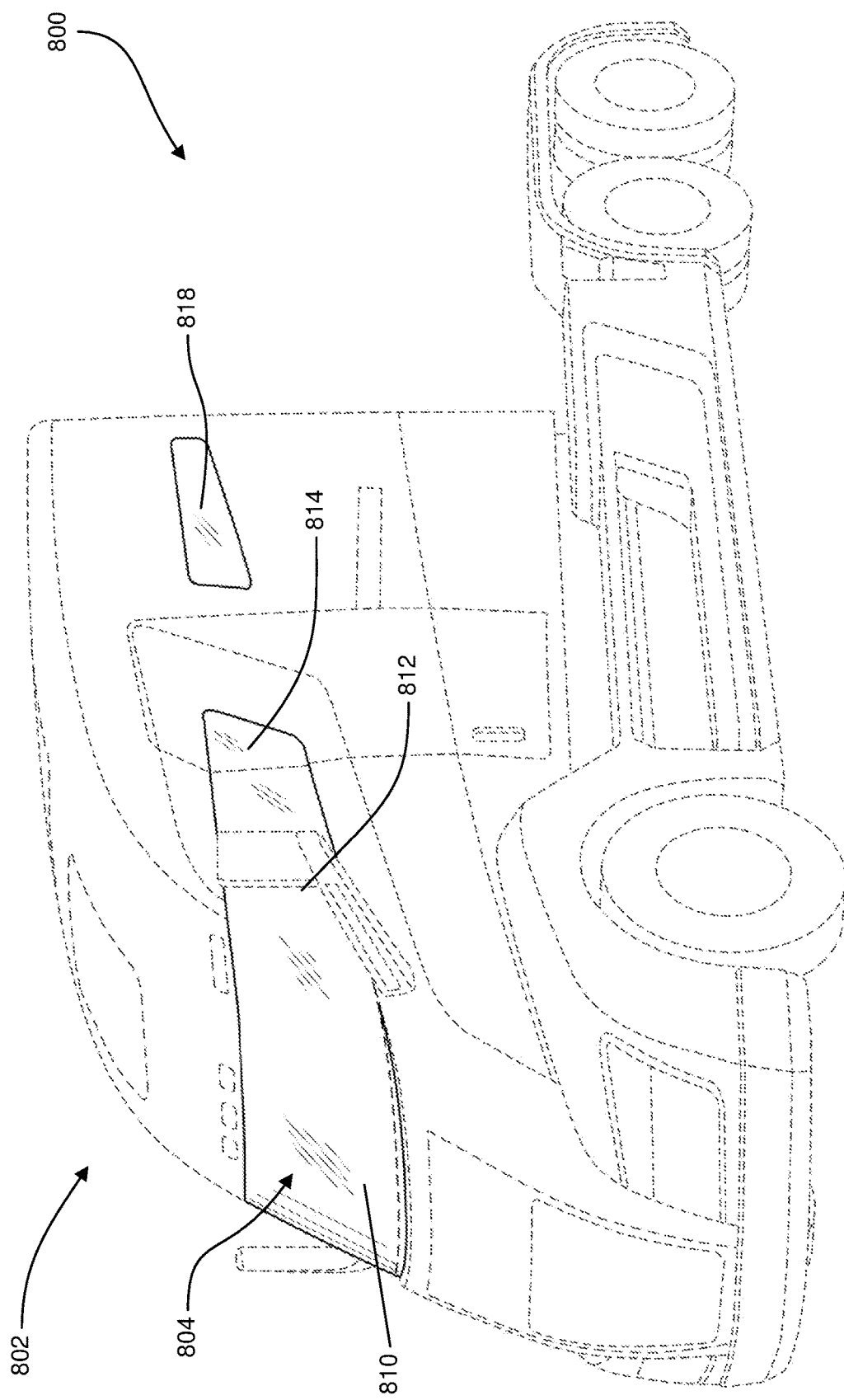
FIG. 8 illustrates a front perspective view of a vehicle with a wrap-around windshield and another window highlighted in bold in accordance with the teachings and principles of the disclosure.

Referring now to FIG. 8, a front perspective view of a vehicle 800 with the windshield and windows highlighted in bold markings is shown. The vehicle 800 includes a vehicle body 802 including a cabin interior within the vehicle body that is configured to accommodate at least one person. The vehicle 800 includes a windshield 804 having a front windshield portion 810 and a side windshield portion 812. The vehicle includes a door window 814 and a side window 818.

Figure 9:
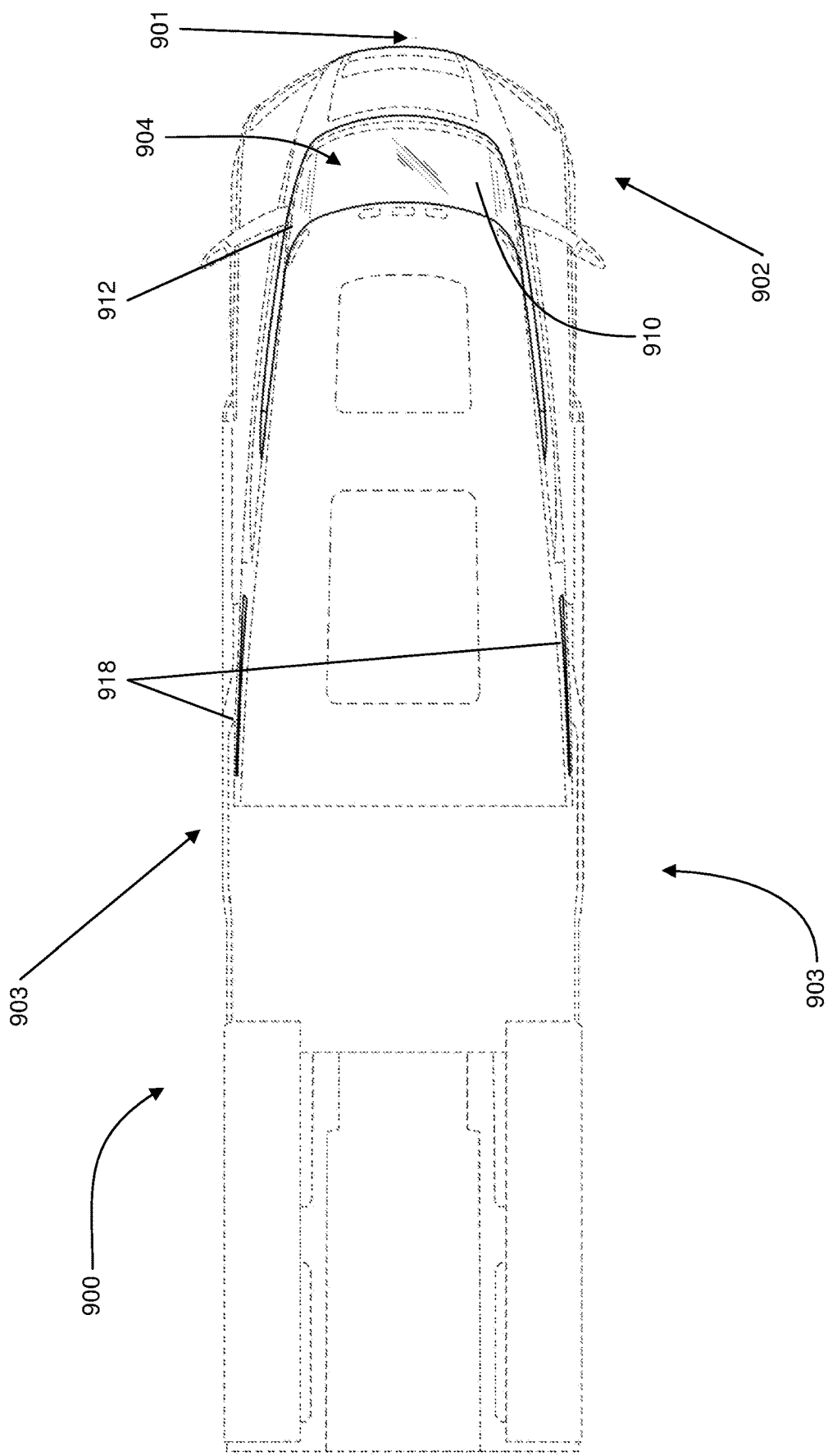
FIG. 9 illustrates an aerial view of a vehicle with the wrap-around windshield and other windows highlighted in bold in accordance with the teachings and principles of the disclosure.

Referring now to FIG. 9, an aerial view of a vehicle 900 with the windshield and windows highlighted in bold markings is shown. The vehicle 900 includes a front end 901 and two side portions 903 that are normal to the front end 901 and parallel and opposite one another. The side portions 903 may be denoted as a first side and a second side. The vehicle 900 includes a vehicle body 902 having a panoramic wraparound windshield 904. The windshield 904 includes a front windshield portion 910 and a side windshield portion 912. The vehicle 900 includes side windows 918 on either side of the vehicle.

Figure 10:
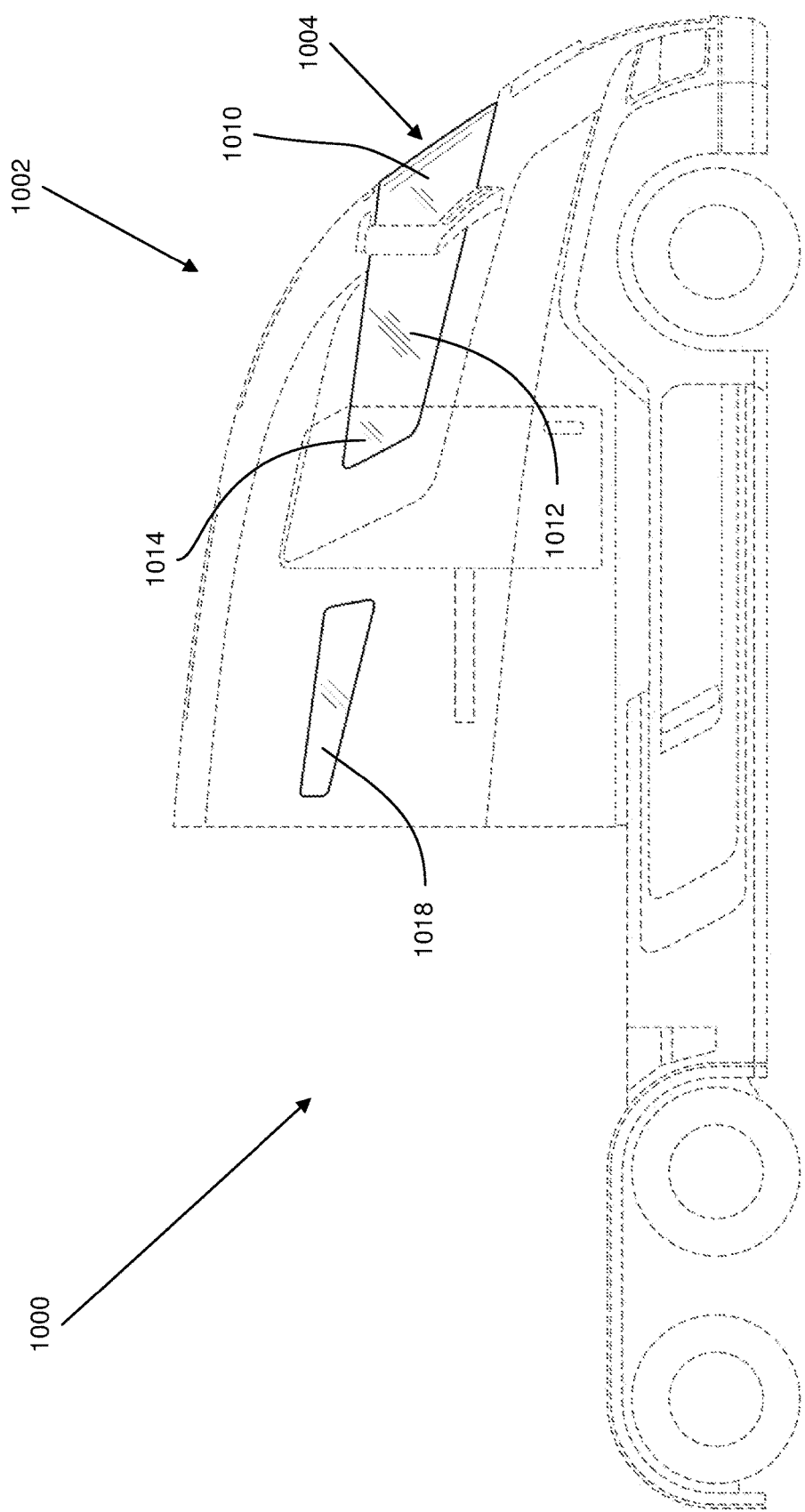
FIG. 10 illustrates a side view of a vehicle with the wrap-around windshield and another window highlighted in bold in accordance with the teachings and principles of the disclosure.

Referring now to FIG. 10, a side view of a vehicle 1000 with the windshield and windows highlighted in bold markings is shown. The vehicle 1000 includes a vehicle body 1002 and a panoramic windshield 1004 is shown. The panoramic windshield 1004 includes a front windshield portion 1010 and a side windshield portion 1012 denoted by the location of the windshield portion relative to the overall vehicle body 1002. The vehicle 1000 includes a door window 1014 that may be in contact with a portion of the windshield 1004 when the door is closed in an implementation as pictured. The vehicle 1000 includes a side window 1018 disposed on either of a first side or a second side of the vehicle 1000.

Figure 11:
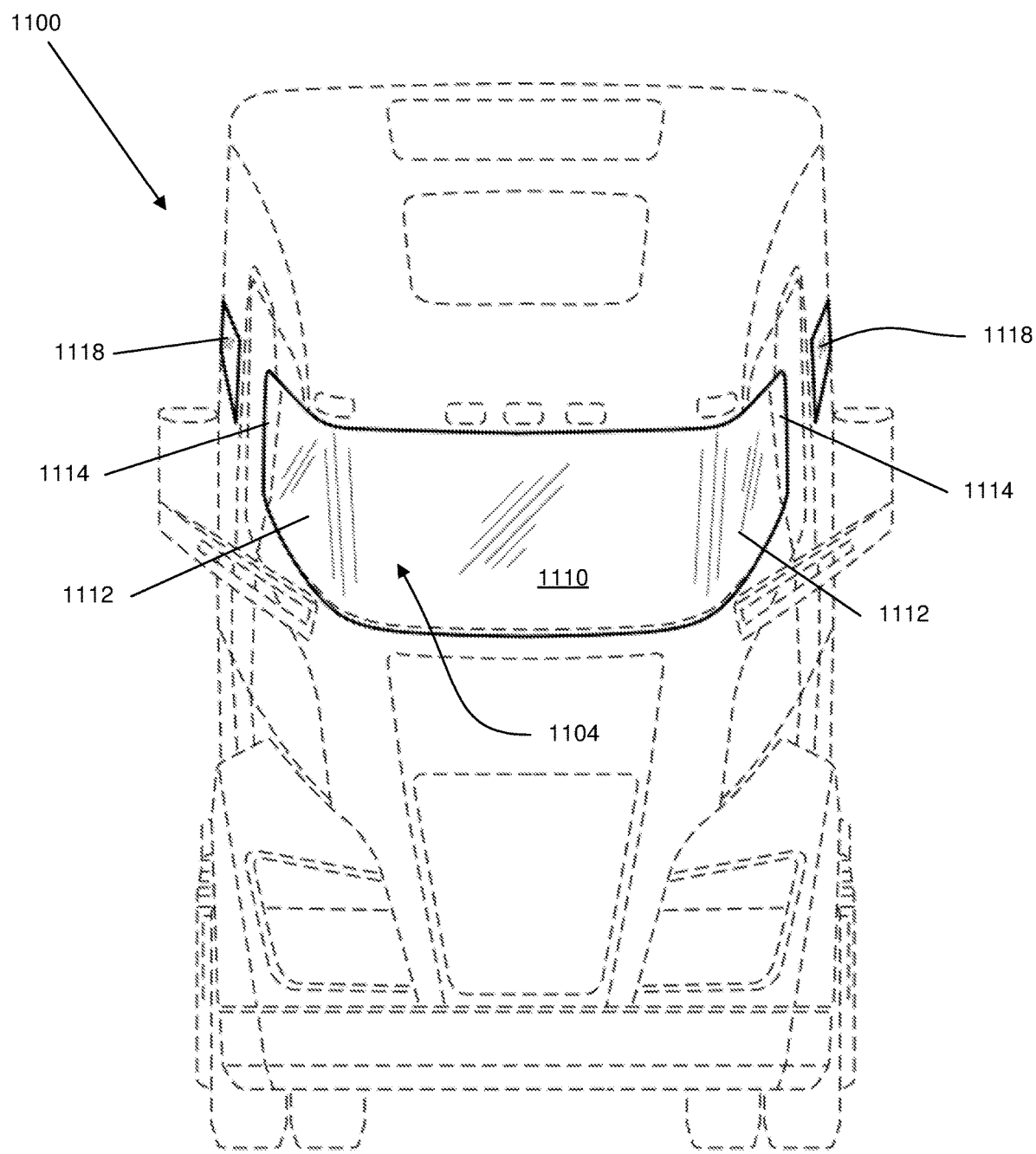
FIG. 11 illustrates a front view of a vehicle with the wrap-around windshield and other windows highlighted in bold in accordance with the teachings and principles of the disclosure.

Referring now to FIG. 11, a front view of a vehicle 1100 with the windshield and windows highlighted in bold markings is shown. The vehicle 1100 includes a front windshield portion 1104 having a front windshield portion 1110 and at least one side windshield portion 1112. The vehicle 1100 includes at least one door window 1114 attached to a vehicle door. The vehicle includes at least one side window 1118.

Figure 12A:
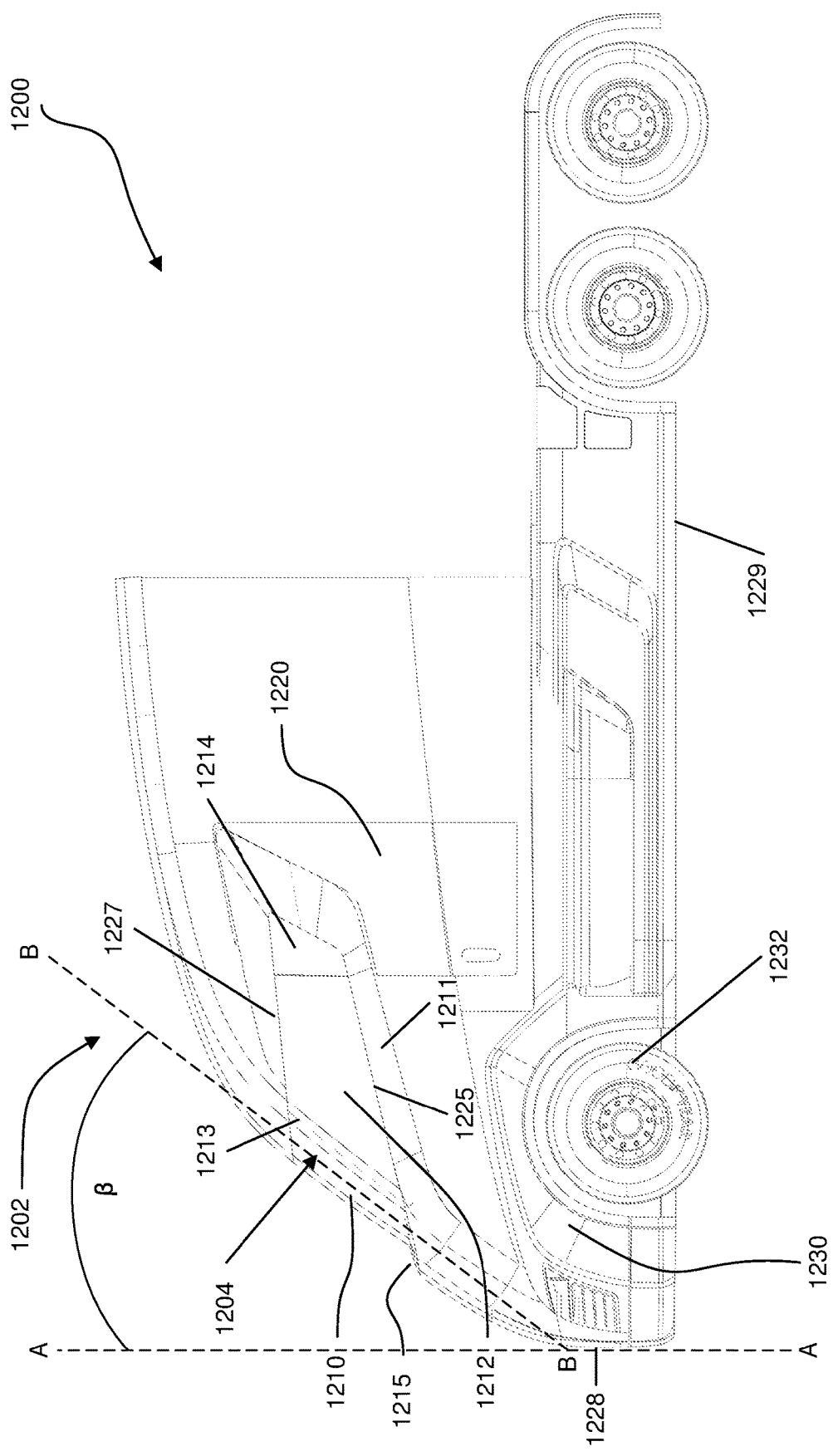
FIGS. 12A and 12B illustrate a side view of a vehicle with a wrap-around windshield in accordance with the teachings and principles of the disclosure.
Figure 12B:
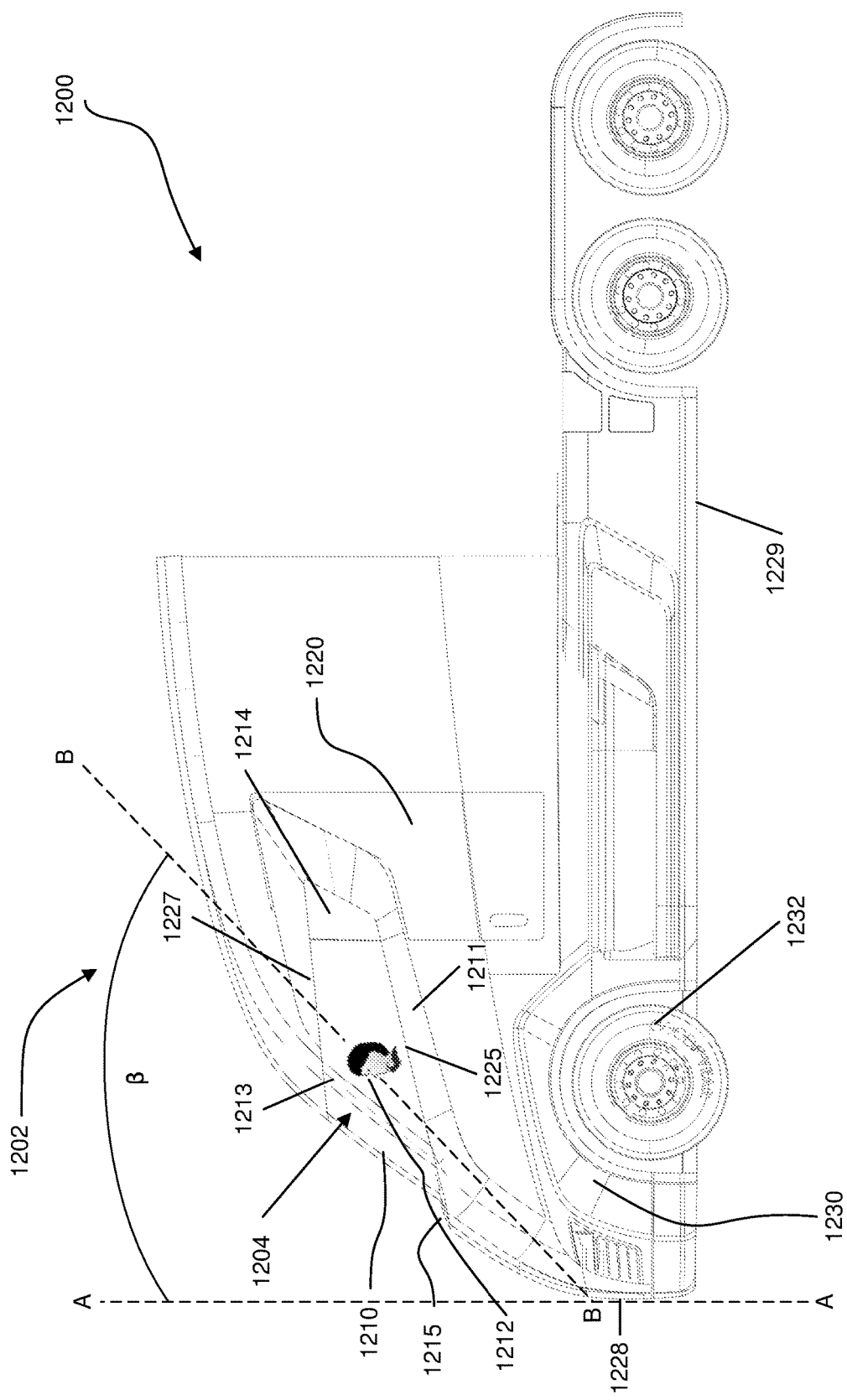

Referring now to FIGS. 12A and 12B, where side views of an embodiment of a vehicle 1200 having a panoramic windshield are shown. The vehicle 1200 includes a windshield 1204 having a front windshield portion 1210 and a side windshield portion 1212. The vehicle 1200 includes a door 1220 with a door window 1214. The vehicle includes a front wheel well 1230 and a front wheel 1232 within a front portion of the vehicle 1200.

In an embodiment as pictured in FIG. 12A, the side windshield portion 1212 makes contact with the door window 1214 when the door 1220 is closed. In such an embodiment, a water-tight seal is made between the door and the surrounding vehicle body, and between the door window 1214 and the side windshield portion 1212. In an alternative embodiment, the side windshield portion 1212 does not extend to the door 1220 or make contact with the door 1220, and the door 1220 instead makes contact only with the vehicle body and not with the side windshield portion 1212. In an embodiment, the side windshield portion 1212 extends partially on to at least one of the vehicle sides. In an embodiment, the side windshield portion 1212 extends on to only one of the two vehicle sides. In an embodiment, the side windshield portion 1212 extends farther on to one of the vehicle sides than it does on to the other vehicle side.

In an embodiment as pictured, the windshield 1204 includes a windshield frame 1211 surrounding at least a portion of the windshield 1204. The windshield frame 1211 may include, for example, a frame securing the windshield in place, an adhesive securing the windshield, a tapered edge on the vehicle body that may or may not serve to secure the windshield, a tapered edge on the vehicle body configured to increase the aerodynamics of the vehicle, or a tapered edge on the vehicle body configured to improve the aesthetics of the vehicle body. In an embodiment as shown, the windshield frame or tapered edge 1211 has varying widths at different positions around the windshield 1204. In an implementation, the windshield 1204 may be angled or formed at an angle relative to a front bumper 1228. The front bumper 1228 may be vertically oriented and substantially normal with respect to a horizontal frame member 1229. An angle $\beta$ may be formed between an imaginary vertical line A-A extending substantially upward from the front bumper 1228 and normal to the horizontal frame member 1229 and an imaging line B-B representing a plane of the windshield 1204. In an implementation shown in FIG. 12B, the angle $\beta$ may be formed between an imaginary vertical line A-A extending substantially upward from the front bumper 1228 and normal to the horizontal frame member 1229 and an imaging line B-B representing a viewing angle of the driver through the windshield 1204. In either implementation, the angle $\beta$ may fall within a range of about twenty-five degrees to about fifty degrees, and may be between about thirty degrees to about forty-five degrees, and may be between about thirty-seven degrees to about forty degrees. It will be appreciated that angle β may be all angles falling within the range of about twenty-five degrees to about fifty degrees, including all angles falling within that range as if those angles were individually set forth herein. It will be appreciated the shape of the front of the vehicle coupled with the angle β of the windshield provides the larger viewing area for the driver, which provides for increased safety. Further, the shape of the front of the vehicle enables the driver of the vehicle to see objects located closer to the front of the vehicle than is typically allowed by traditional semi-trucks and vehicles having larger rectangular hoods on the front ends.

In an embodiment as pictured, the vehicle body 1202 includes a windshield break 1215 near the lower edge of the windshield 1204. The windshield break 1215 may comprise a flat or nearly flat portion in the vehicle body near the bottom of the windshield 1204. The windshield break 1215 may serve to, for example, collect debris that has fallen on the windshield, house windshield wipers in a protected environment, improve the aerodynamic characteristics of the vehicle body 1202, or improve the aesthetics of the vehicle body 1202. Alternatively, in another embodiment, the vehicle body 1202 does not include a windshield break and instead the windshield 1204 and the front of the vehicle body 1202 form a straight or nearly straight line that has few discernable breaks. That is in an alternative embodiment, the front of the vehicle 1200 appears to have a flat surface without any dramatic angles or breaks in the construction.

In an embodiment as pictured, the vehicle 1200 includes a windshield frame 1213. In such an embodiment, the windshield frame 1213 may include a plurality of frame elements around the windshield 1204. In such an embodiment, the windshield 1204 may comprise a single sheet of transparent substrate that extends across the front of the vehicle and wraps at least partially on to one of the two sides of the vehicle. Alternatively, in such an embodiment, the windshield 1204 may comprise a plurality of pieces of transparent substrate forming a panoramic windshield view when held in place by the windshield frame 1213.

In an embodiment, the windshield 1204 includes an upper taper 1227 and a lower taper 1225. In an embodiment, the upper portion of the windshield 1204 is straight as it extends across the front of the vehicle and extends upward toward upper taper 1227 as it extends across at least one of the sides of the vehicle. In an embodiment, the lower portion of the windshield 1204 is tapered as it extends across the front of the vehicle and it tapers upward toward lower taper 1225 as it extends across a portion of at least one of the sides of the vehicle. In an embodiment, the lower taper 1225 and the upper taper 1227 are not angled to the same degree (as shown). In an embodiment, the lower taper 1225 and the upper taper 1227 are parallel with one another.

In an embodiment, the windshield 1204 including the front windshield portion 1210 and a side windshield portion 1212 are formed of a single continuous piece of transparent substrate. In an embodiment, the windshield 1204 is formed of a plurality of pieces of transparent substrate that connect to form a panoramic or near-panoramic view from inside the vehicle body 1202. The windshield 1204 may be formed of, for example, glass, tinted glass, UV resistant glass, glare-resistant glass, bullet proof glass, shatter-resistant glass, and so forth. The windshield 1204 may be formed of any suitable transparent substrate.

Figure 13:
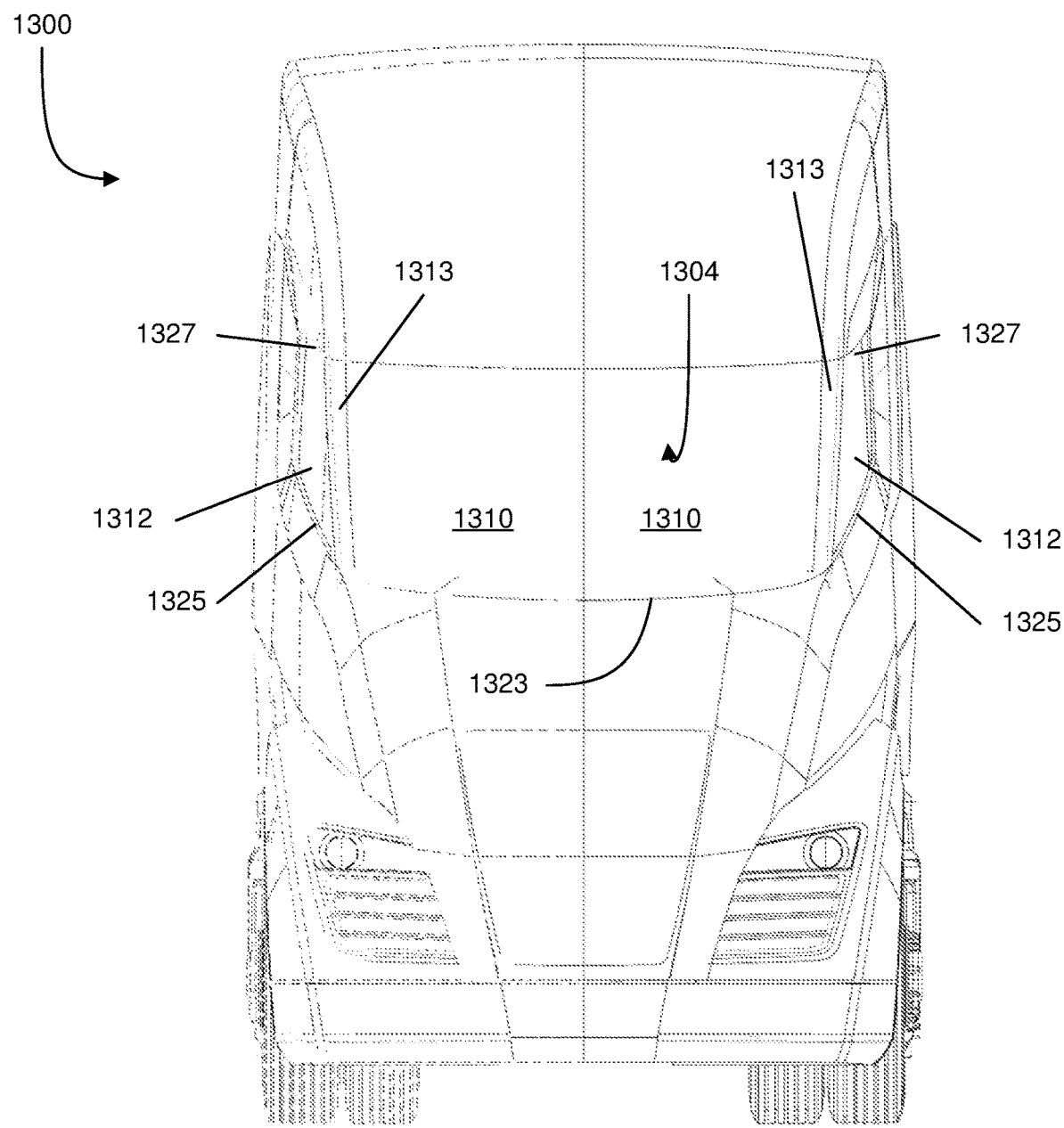
FIG. 13 illustrates a front view of a vehicle with a wrap-around windshield in accordance with e teachings and principles of the disclosure.

Referring now to FIG. 13, a front view of a vehicle 1300 having a windshield 1304 is shown. The windshield 1304 includes a front windshield portion 1310 and a side windshield portion 1312. The windshield 1304 may comprise a single continuous sheet of transparent substrate molded to the curvature of the vehicle body. The windshield 1304 may include one or more windshield frame 1313 pieces whether or not the windshield 1304 is formed of a single continuous piece or of a plurality of separate pieces. In an embodiment, the windshield 1304 has a continuous appearance wherein the windshield appears to be constructed of a single piece of a transparent substrate without any structural support. In such an embodiment, the windshield frame 1313 may be configured to provide a gradual slope matching the overall shape of the vehicle 1300 and the windshield 1304, and disguising the presence of the windshield frame 1313. In such an embodiment, the windshield 1304 may be formed of separate pieces of a transparent substrate or it may be formed of a single piece of a transparent substrate that is molded to extend across the front of the vehicle and to wrap around a portion of at least one of the first side or the second side of the vehicle. The windshield frame 1313 may provide structural support to the vehicle and to the windshield 1304 without regard to whether the windshield 1304 is formed of a single continuous piece or formed of a plurality of pieces.

In an embodiment, the windshield frame 1313 or support member provides structural support for the vehicle 1300 and the windshield 1304 is supported by the windshield frame 1313. In such an embodiment, the windshield 1304 is formed of a continuous piece of a transparent substrate or it may be formed of a plurality of pieces of a transparent substrate.

The windshield frame 1313 may form a support structure for the vehicle 1300 when attached or configured in varying angle degrees. For example in an embodiment as pictured, the windshield frame 1313 forms an obtuse angle with respect to the vehicle's roof when viewed from the side of the vehicle. The windshield frame 1313 provides a gradual slope for the windshield 1304 and the vehicle body. In an alternative embodiment, the windshield frame 1313 is shaped into a smaller angle than illustrated in FIG. 13, wherein the windshield frame 1313 provides a steeper angle or slope and may provide a different overall shape to the vehicle body. In an example embodiment, the windshield frame 1313 forms a substantial ninety-degree or nearly ninety-degree angle with respect to the roof of the vehicle 1300 and provides a structural support for the windshield 1304.

In an implementation, the windshield frame 1313 is configured to appear inconspicuous next to the windshield 1304, such that the vehicle 1300 appears to not have a windshield frame 1313 at all. In such an implementation, the windshield frame 1313 may be colored similarly to the color of a tinted windshield glass, for example, or the windshield frame 1313 may be gently tapered with the windshield 1304 to provide an elegant aesthetic appeal to the overall vehicle 1300.

The windshield 1304 includes a lower taper 1325 and an upper taper 1327. The lower taper 1325 and the upper taper 1327 indicate an angle or shape of the windshield as it extends across a side portion of the vehicle. The windshield 1304 further includes a lower front taper 1323 indicating an angle or shape of the windshield 1304 as it extends across the front of the vehicle body. In an implementation, the lower front taper 1323 across the front forms a curved shape. In an implementation, the lower taper 1325 and upper taper 1327 are parallel, and in yet another implementation they taper at varying degrees.

EXAMPLES

The following examples pertain to further embodiments.

Example 1 is a vehicle including a vehicle body having a front, a first side, and a second side, wherein the first side and the second side are opposite one another on the vehicle body. The vehicle includes a cabin located within the body of the vehicle, where the cabin comprises an interior that is configured to accommodate at least one person. The vehicle includes at least one door that provides ingress and egress to the interior of the cabin of the vehicle. The vehicle includes a windshield that provides a visual line of sight out of the cabin for a user located within the interior of the cabin, wherein the windshield extends across the front and onto at least a portion of at least one of the first side or the second side.

Example 2 is a vehicle as in Example 1, wherein the vehicle is an electric vehicle comprising a battery pack that is coupled to an electric drive train.

Example 3 is a vehicle as in any of Examples 1-2, wherein the vehicle comprises a combustion engine configured to generate power by using combustion energy of fuel.

Example 4 is a vehicle as in any of Examples 1-3, wherein the windshield extends to a vertical side of the door on at least one of the first side or the second side.

Example 5 is a vehicle as in any of Examples 1-4 wherein the door comprises a window.

Example 6 is a vehicle as in Example 5, wherein the window matches up with an end portion of the windshield when the door is closed.

Example 7 is a vehicle as in any of Examples 4-6, wherein the window and the windshield form a water-tight seal when the door is closed.

Example 8 is a vehicle as in any of Examples 5-7, wherein the window and the windshield provide a continuous field of vision from the interior of the cabin to an exterior of the cabin when the door is closed.

Example 9 is a vehicle as in any of Examples 1-8, wherein the door is a sliding door.

Example 10 is a vehicle as in any of Examples 1-9, wherein the windshield comprises a tinted glass.

Example 11 is a vehicle as in any of Examples 1-10, wherein the front of the vehicle and a front portion of the windshield form an aerodynamic shape.

Example 12 is a vehicle as in Example 11, wherein the aerodynamic shape comprises a straight line extending from an upper portion of the windshield to a front most point of the vehicle.

Example 13 is a vehicle as in any of Examples 1-12, further comprising a front-end curvature having an aerodynamic shape.

Example 14 is a vehicle as in Example 13, wherein the windshield comprises a windshield curvature matching the front-end curvature.

Example 15 is a vehicle as in any of Examples 1-14, wherein the windshield is a continuous wrap-around windshield.

Example 16 is a vehicle as in any of Examples 1-15, wherein the windshield comprises a single piece of material.

Example 17 is a vehicle as in any of Examples 1-16, wherein the door is a sliding door.

Example 18 is a vehicle as in Example 17, wherein the door moves outward with respect to the body and backward with respect to the front of the vehicle as the door is moved to an open positron.

Example 19 is a vehicle as in any of Examples 1-18, wherein the at least one door is located approximately at a midpoint of the body of the vehicle to provide ingress and egress into the cabin.

Example 20 is a vehicle as in any of Examples 1-19, wherein the vehicle is a semi-truck.

Example 21 is a vehicle as in any of Examples 1-20, wherein the vehicle is an electric driven class 7 semi-truck.

Example 22 is a vehicle as in any of Examples 1-21, wherein the vehicle is an electric driven class 8 semi-truck.

Example 23 is a vehicle including a vehicle body having a front, a first side, and a second side, wherein the first side and the second side are opposite one another on the vehicle body. The vehicle includes a front portion of the vehicle comprising a front 50% of the total length of the vehicle. The vehicle includes a wheel comprising a wheel footprint, wherein the wheel is located within the front portion of the vehicle. The vehicle includes a cabin located within the vehicle body, wherein the cabin comprises a cabin interior configured to accommodate at least one person. The vehicle includes a windshield at the front end of the vehicle, wherein the windshield is configured to provide a visual line of sight from the cabin interior to an exterior of the vehicle, wherein the windshield extends across the front and onto at least a portion of at least one of the first side or the second side, and wherein the wheel footprint is located directly below the windshield.

Example 24 is a vehicle as in Example 23, wherein the vehicle is an electric vehicle comprising a battery pack that is coupled to an electric drive train.

Example 25 is a vehicle as in any of Examples 23-24, wherein the vehicle comprises a combustion engine configured to generate power by using combustion energy of fuel.

Example 26 is a vehicle as in any of Examples 23-25, wherein the windshield comprises a single piece of material.

Example 27 is a vehicle as in any of Examples 23-26, wherein the windshield comprises a plurality of pieces of material attached to a vehicle body frame.

Example 28 is a vehicle as in any of Examples 23-27, wherein the windshield comprises a continuous piece of glass molded to an exterior curvature of the vehicle body.

Example 29 is a vehicle as in any of Examples 23-28, wherein the windshield comprises a windshield curvature matching a vehicle curvature of the vehicle body.

Example 30 is a vehicle as in any of Examples 23-29, wherein the windshield comprises an upper length along the top length of the windshield and a lower length along the lower length of the vehicle, wherein the upper length is shorter than the lower length.

Example 31 is a vehicle as in any of Examples 23-30, wherein the vehicle further comprises a door disposed in at least one of the first side or the second side and wherein the door comprises a window.

Example 32 is a vehicle as in Example 31, wherein the door is a sliding door.

Example 33 is a vehicle as in Example 31, wherein the door is a hinged door.

Example 34 is a vehicle as in any of Example 31-33, wherein the door comprises a window.

Example 35 is a vehicle as in Example 34, wherein the window is configured to line up with an end portion of the windshield when the door is closed.

Example 36 is a vehicle as in Example 34, wherein the windshield and the window form a continuous field of view from the interior of the cabin to the exterior of the vehicle when the door is closed.

Example 37 is a vehicle as in any of Examples 23-36, wherein the vehicle is a semi-truck.

Example 38 is a vehicle as in any of Examples 23-37, wherein the vehicle is an electric driven class 7 semi-truck.

Example 39 is a vehicle as in any of Examples 23-38, wherein the vehicle is an electric driven class 8 semi-truck.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

While various embodiments of the present disclosure have been described above, they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A vehicle comprising:
   a vehicle body comprising a front, a first side, and a second side opposite the first side on the vehicle body;
   a cabin located within the vehicle body and comprising an interior that is configured to accommodate at least one person;
   at least one door that provides ingress and egress to the interior of the cabin;
   a windshield having a continuous front windshield portion and extending across the front of the vehicle and a least partially into at least one of the first side or the second side,
   wherein a foremost portion of the continuous front windshield portion is forward of a foremost portion of a front wheel provided with the vehicle body, and
   wherein a seat is located within the cabin and at least a portion of the seat is located forward of a rearmost portion of the front wheel, such that the at least one person is positioned at least partially above the front wheel; and
   a tapered edge on at least one of the first side or the second side, the tapered edge extending inward from the vehicle body to the windshield.

2. The vehicle of claim 1, wherein the vehicle is an electric vehicle comprising a battery pack that is coupled to an electric drivetrain.

3. The vehicle of claim 1, wherein the windshield extends to the door on at least one of the first side or the second side.

4. The vehicle of claim 3, wherein the windshield provides a continuous field of vision from the interior of the cabin to an exterior of the cabin when the door is closed.

5. The vehicle of claim 1, wherein the windshield comprises an upward taper on the lower edge of the windshield where the windshield extends into at least one of the first side or the second side.

6. The vehicle of claim 1, wherein the windshield comprises a taper on at least one of the lower or upper edge of the windshield where the windshield extends into at least one of the first side or the second side.

7. The vehicle of claim 1, wherein the front of the vehicle and the continuous front portion of the windshield form an aerodynamic shape.

8. The vehicle of claim 1, wherein the windshield comprises a single piece of transparent substrate.

9. The vehicle of claim 1, further comprises a windshield frame configured to secure the windshield in place.

10. The vehicle of claim 1, wherein the door is a sliding door.

11. The vehicle of claim 10, wherein the door moves outward with respect to the body and backward with respect to the front of the vehicle as the door is moved to an open position.

12. The vehicle of claim 1, wherein the at least one door is located approximately at a midpoint of the body of the vehicle.

13. A vehicle comprising:
   a vehicle body comprising a front, a front bumper, a first side, and a second side positioned opposite the first side on the vehicle body;
   a front portion of the vehicle comprising a front 50% of the total length of the vehicle;
   a wheel positioned within the front portion;
   a cabin located within the vehicle body and comprising a cabin interior configured to accommodate at least one person; and
   a windshield at the front of the vehicle, wherein the windshield includes a front continuous windshield portion configured to provide a visual line of sight from the cabin interior to an exterior of the vehicle,
   wherein the windshield extends across the front and wraps onto a portion of at least one of the first side or the second side,
   wherein a foremost portion of the front continuous windshield portion is forward of a foremost portion of the wheel,
   wherein the windshield comprises an upward taper on an upper portion of the windshield on at least one of the first side or the second side,
   wherein an angle formed between the front bumper and a plane of the front continuous windshield portion is between about 30 degrees and about 45 degrees, and
   wherein a seat is located within the cabin and at least a portion of the seat is located forward of a rearmost portion of the front wheel, such that the at least one person is positioned at least partially above the front wheel.

14. The vehicle of claim 13, wherein the vehicle is an electric vehicle comprising a battery pack coupled to an electric drive train.

15. The vehicle of claim 13, wherein the windshield comprises a single piece of transparent substrate.

16. The vehicle of claim 13, wherein the angle formed between the front bumper and the plane of the front continuous windshield portion is between about 37 degrees and about 40 degrees.

17. The vehicle of claim 13, wherein the windshield comprises an upper length along the top length of the windshield and a lower length along the lower length of the vehicle, and wherein the upper length is shorter than the lower length.

18. The vehicle of claim 13, wherein the vehicle further comprises a door disposed in at least one of the first side or the second side and wherein the door comprises a door window.

19. The vehicle of claim 18, wherein the door window lines up with an end portion of the windshield when the door is closed.

20. The vehicle of claim 19, wherein the windshield and the door window form a continuous field of view from the interior of the cabin to the exterior of the vehicle when the door is closed.

* * * * *

UNITED STATES PATENT AND TRADEMARK OFFICE
CERTIFICATE OF CORRECTION

PATENT NO. : 10,654,530 B2
APPLICATION NO. : 16/381434
DATED : May 19, 2020
INVENTOR(S) : Milton et al.

Page 1 of 1

It is certified that error appears in the above-identified patent and that said Letters Patent is hereby corrected as shown below:

On the Title Page

On the second page, part of Item (60) Related U.S. Application Data:
Delete the duplicative recitation of "provisional application No. 62/391,745, filed on May 9, 2016"; and
Delete "2015, provisional application No. 62/381,745 filed on Aug. 31, 2016" and insert therefor --2015.--

Signed and Sealed this
Twenty-second Day of September, 2020

Andrei Iancu
*Director of the United States Patent and Trademark Office*